United States Patent
Rice

[11] Patent Number: 6,009,660
[45] Date of Patent: Jan. 4, 2000

[54] FISHING LURE HOLDER

[76] Inventor: Thomas E. Rice, 415 Emerald Cir., Medford, Oreg. 97501

[21] Appl. No.: 08/984,973

[22] Filed: Dec. 4, 1997

[51] Int. Cl.[7] .................................................. A01K 97/06
[52] U.S. Cl. ...................................... 43/57.1; 206/315.11
[58] Field of Search ..................... 43/54.1, 57.1, 43/57.2; 206/315.11, 315.1; 220/521; 224/916, 920

[56] References Cited

U.S. PATENT DOCUMENTS

| | | | |
|---|---|---|---|
| 4,238,901 | 12/1980 | Martinet | 43/47.5 R |
| 4,680,886 | 7/1987 | Caselli, Sr. | 43/57.1 |
| 4,742,640 | 5/1988 | Moore | 43/57.1 |
| 5,182,878 | 2/1993 | Clark | 43/57.1 |
| 5,410,836 | 5/1995 | Hardy | 43/57.1 |

Primary Examiner—Jack W. Lavinder
Attorney, Agent, or Firm—Patent & Trademark Services; Thomas Zack

[57] ABSTRACT

A fishing lure storage device having an opened casing and a pivotally mounted plate for retaining hooks in spaced notches. The plate fits into a cavity within the casing and is mounted by a pivot pin to one of its ends. A protrusion on the end of the plate fits into a hole in the casing to lock the plate's end opposite its pivot joint when in a lure storing position. By applying an inward pressure to the protrusion at slotted end of the plate and pivoting the plate, access to the notched stored hooks and their depending lures can be easily had. The casing and plate may be made of a transparent, clear or colored, molded plastic material to permit view of the stored hooks on the plate's notches.

4 Claims, 2 Drawing Sheets

FISHING LURE HOLDER

BACKGROUND OF THE INVENTION

Fishing lures need to be stored when not in use. Storage devices to accommodate the lures' hooks and attached lures are known. With many such devices the hooks are placed in a hole, an indentation, recess or trough and removed when needed. In some cases, retaining fasteners or magnets bearing on the in-place hooks and attached lures are used to maintain them in place, it is essential that such stored lures not become a tangled mess to avoid sticking a user with a hook when attempting to retrieve a specific lure from a group of stored lures. The present invention seeks to improve upon such lure storage devices by providing for the storage of a plurality of lures within a common casing wherein each lure's hook or hooks is maintained in a specific notch on a pivotally mounted casing backing blade or plate in the interior of the casing while the attached lures can dangle outside the casing as further described herein.

DESCRIPTION OF THE PRIOR ART

Storage devices for fishing lures take on various configurations. For example, in U.S. Pat. No. 4,680,886 to Caselli, Sr. a universal storage device for fishing lures is disclosed having a body with longitudinal recess and hook inserted bores adjacent the recess. By winding the lure's leader around the bore inserted hooks and body the lures are retained in place.

In the Moore reference (U.S. Pat. No. 4,742,640) the lure holder has a U-shaped trough with a resilient, synthetic resin material in the trough. The tips of the hooks are embedded in the trough's material.

The Clark patent (U.S. Pat. No. 5,182,878) describes a fish lure holder having a cylindrical casing with spaced holes to receive the hook's tips.

In U.S. Pat. No. 5,410,836, Hardy joins tubular compartments each with annular permanent magnets affixed to their opened ends to hold the lures.

The present invention provides for a common opened casing with a pivotally mounted backing having hook retaining notches spaced there along to hold the lures' hooks and permit the main lure bodies to dangle from the casing as more further set forth in this specification.

SUMMARY OF THE INVENTION

This invention relates to a fishing lure holding device having a common opened housing with a pivotally mounted backing plate within the casing. Spaced notches on the plate act to retain the lures' hooks while the connected lure bodies dangle from the casing.

It is the primary object of the present invention to provide for an improved fishing lure holding device.

Another object is to provide for such a device wherein the lures' hooks are stored safety within a common casing on a backing plate.

These and other objects and advantages of the present invention will become apparent to readers from a consideration of the ensuing description and the accompanying drawings.

DESCRIPTION OF THE PREFERRED EMBODIMENT

Figure 1:
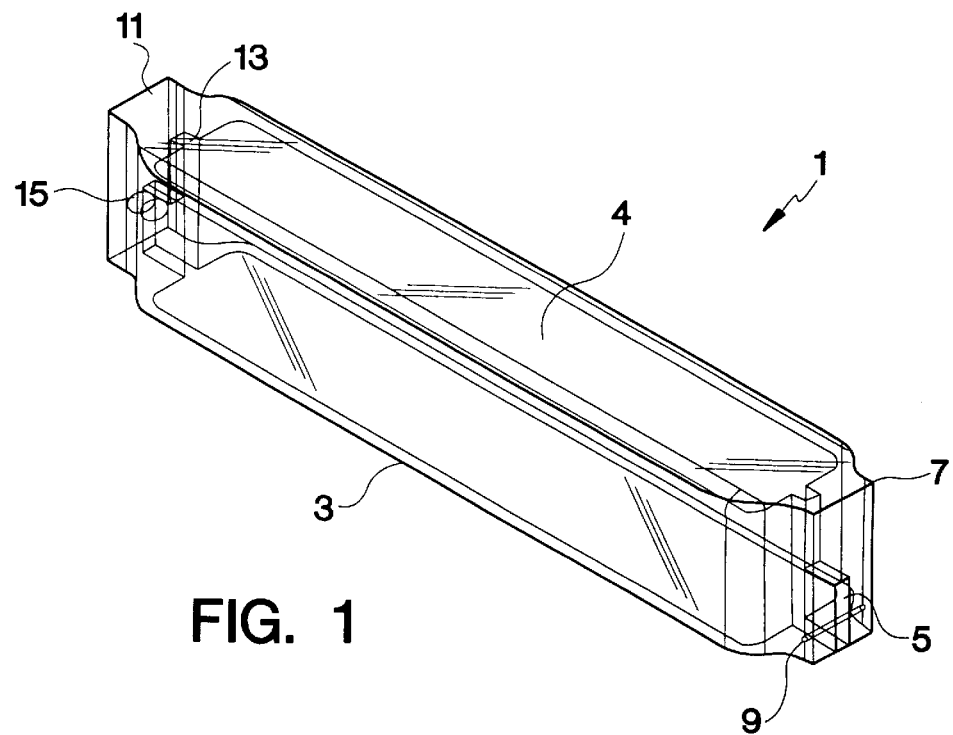
FIG. 1 is a side perspective bottom view of the casing used with the invention's preferred embodiment.

FIG. 1 is a side perspective bottom view of the top opened casing 1 used with the invention's preferred embodiment. Normally this casing is made of a transparent molded plastic material to permit the easy viewing of items stored within its longitudinal top opened cavity 3. This casing may be made of a colored or clear plastic material. The casing's cavity 3 is opened on the top and generally closed on all other sides and the observed lower bottom 4.

At one end of the casing is a vertical casing slot 5 opened on the casing top and extending about half way down and through the casing side. This slot 5 runs down a vertical end extension 7 of the casing and is intersected by a pin receiving hole 9 which extends through the casing's extension on both sides of the slot. Opposite the slot 5 on the other end of the casing 1 is another casing vertical end extension 11 almost identical to the casing extension 7 without its vertical slot 13 extending through the casing extension wall. Closer to the casing top is a single lock retaining member receiving hole 15 which intersects with the vertical slot 13.

Figure 2:
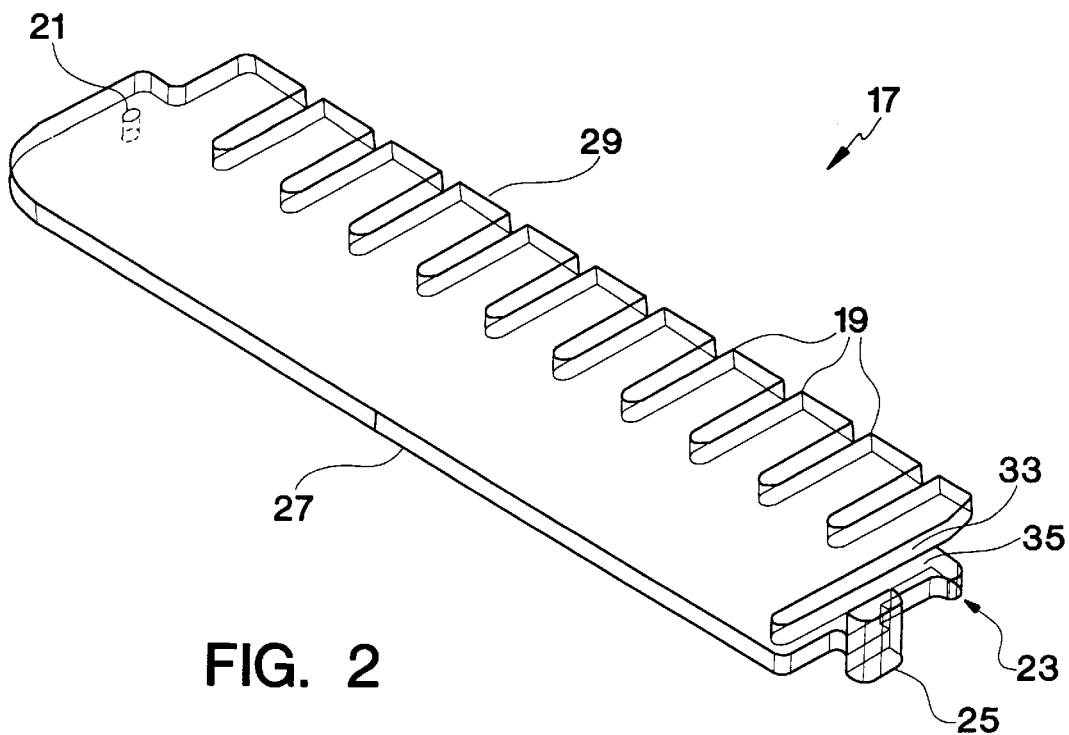
FIG. 2 is a side perspective view of the hook retaining backing plate usable with the FIG. 1 embodiment casing.

FIG. 2 is a side perspective view of the hook retaining backing plate 17 usable with the FIG. 1 embodiment casing. This backing plate is made of the same molded clear plastic material as the casing 1 and is sized and shaped to longitudinally fit within the opened top of the casing the extending substantially the total length of the cavity 3.

A series (ten) equally spaced opened notches 19 are cut into the bottom side of the plate 17. These notches are used to retain hooks from individual lures when one lure is placed in each notch with its attached lure dangling from the backing plate 17 and opened casing 1. Near one end of the plate is a through hole 21 into which a pivot pin may be inserted to pivotally mount the plate in the casing cavity when its plate end is mounted in slot 5 and has the hole 21 aligned with hole 9.

At the plate's other end is a protruding lock extension 23 and the push-to-release button extension 25. Lock extension 23 is shaped and sized to fit partially through and into the casing hole 15 when the plate is mounted in the casing's cavity. Thus, the free end of lock extension 23 will not protrude from the casing when in place. The plate's top side 27 and the upper portion of the plate extends from the casing when the plate is mounted in the cavity 3. The lower plate side 29 having the opened notches therein facing downwardly into the casing towards the casing bottom 4 but is suspended above the bottom due to its side mounts.

Figure 3:
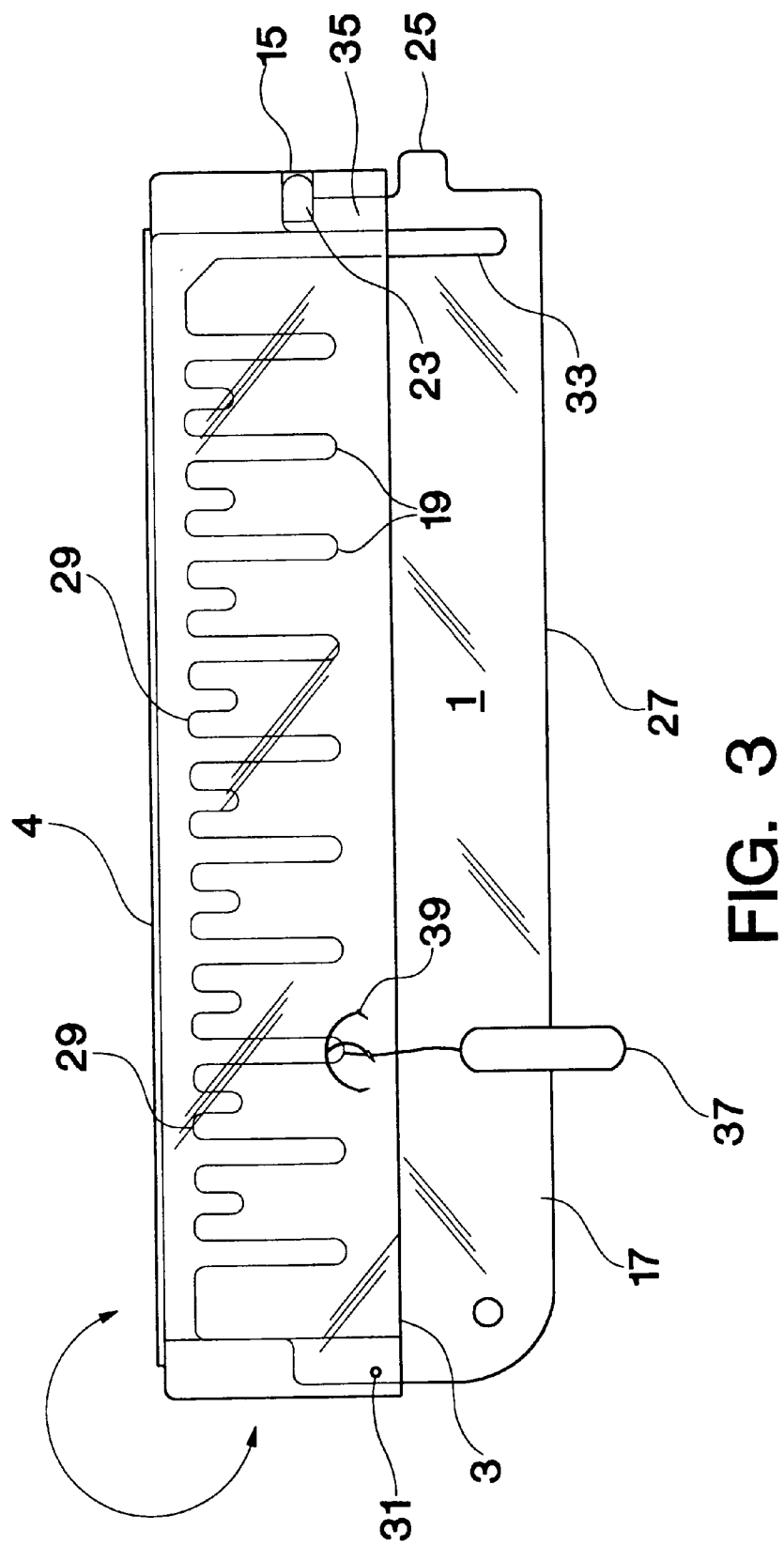
FIG. 3 shows a side up righted view of the two assembled FIG. 1 and FIG. 2 components.

FIG. 3 shows a side up righted view of the two assembled FIG. 1 and FIG. 2 components making up the complete fishing lure storage device. In this view, FIG. 3, the casing's opened cavity 3 is on top and the stainless steel pivot pin 31 is inserted through the hole 21 to mount the plate in the casing's end slot 5. The lock retaining extension 23 is inserted into the hole 15 thereby suspending the hook supporting plate 17 above the casing bottom 4. The plate has a vertical opened slot 33 adjacent plate extensions 23 and 25 which is closed on its top where joined to the plate but opened on its bottom side. This slot 33 provides flexibility to the narrow plate section 35 which mounts the two extensions.

Since both the casing and plate are made of clear plastic materials, the downwardly facing plate notches 19 are visible to a user. The treble hooked lure 37 is shown dangling from the opened top of the casing 1 with one of its three end hooks 39 placed in the closed end of a notch 19 and over the plate to hold the hook thereto. Clearly each of the other notches could also store a lure by placing its hooked end over one of the notches. When so placed, the lure end 37 resides outside the casing 1 and depends from its retaining notch while the closed casing protects a user. This insures users will not be impacted by the tips of the retained hooks and allow easy access to them by squeezing the plates section 35 towards slot 33 to dislodge lock extension from its casing retaining hole 15. Finally the plate 17 is pivot on its pin 31 to permit installation or removal, as desired, of the hooks from the plate. Since hole 15 can be accessed from outside the casing, a user could also simply push a pointed object like a pen, pencil, etc. into the hole to force back the strip 35 against the slot 33 to release the lock and then pivot the plate open to allow access to the stored lures.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A fishing lure storage device comprising:
   a generally closed casing having a length, a first end a second end, and one opened side,
   said casing having an interior cavity extending substantially the length of the casing;
   a plate backing having a length, a first end and a second end, said plate backing being mounted within the interior cavity of the casing by a single pivot pin which extends through the first end of the plate and into the first end of the casing, said second end of the plate being a free end;
   said plate having a plurality of spaced hook retaining notches located along the length of the plate and a locking member protrusion on the plate's second free end, said locking member protrusion being engageable with a hole in the second end of the casing for locking the plate to the casing.

2. The fishing lure storage device as claimed in claim 1, wherein said plate has slot located near the second end with the locking member to provide a flexible strip on which the protrusion is mounted.

3. The fishing lure storage device as claimed in claim 2, wherein said casing is made of a transparent plastic material to permit viewing of the plate backing and the hook retaining notches when locked in place.

4. The fishing lure storage device as claimed in claim 1, wherein said spaced hook retaining notches are located on one side of said plate and said casing has a closed bottom, said plate with said side with notches being suspended above the casing's bottom when the plate's free end is locked to the casing.

* * * * *